Feb. 5, 1952  D. W. RAWNSLEY ET AL  2,584,921
MEANS FOR COUNTERBALANCING A PIVOTED ARM OR MEMBER
Filed Feb. 10, 1949  2 SHEETS—SHEET 1
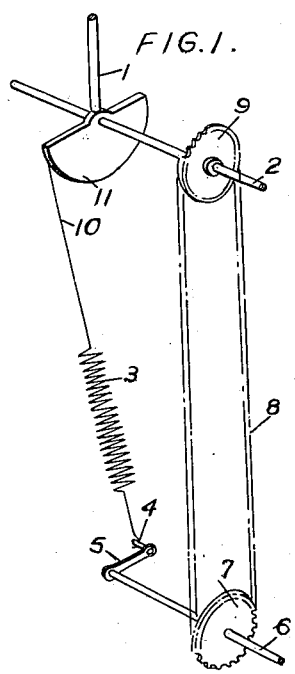
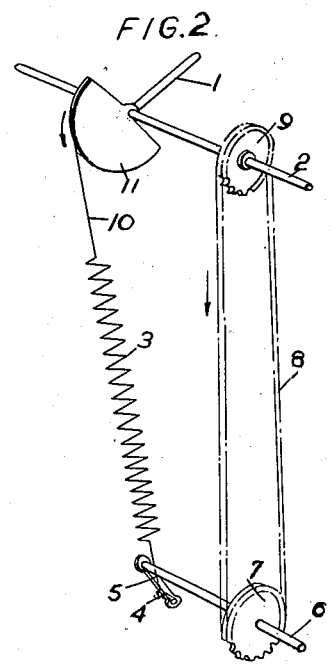
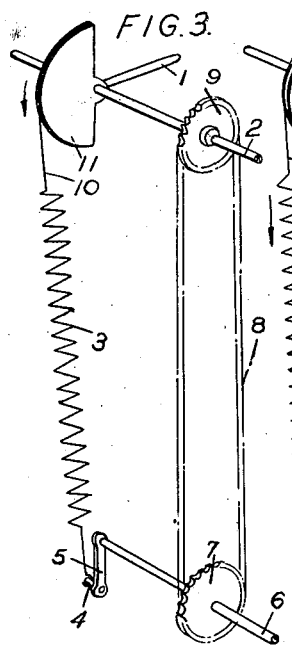
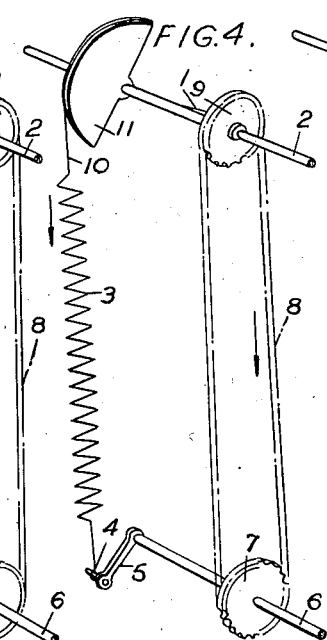
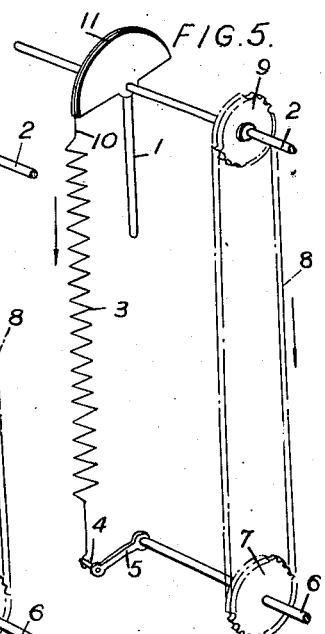
Inventors
DAVID W. RAWNSLEY, EDWARD R. GREEN
and JOHN G. GILL
By
Wilfred E. Lawson
Attorney

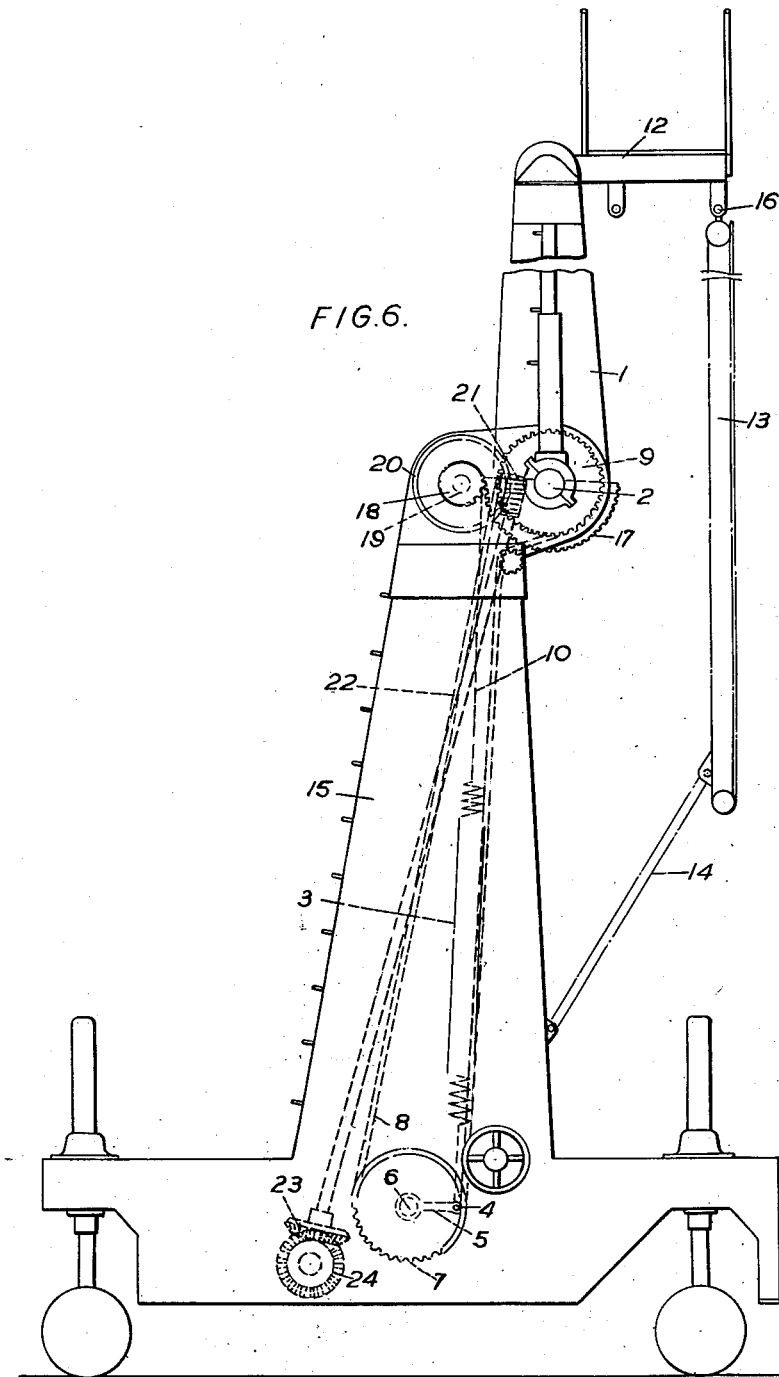

Patented Feb. 5, 1952

2,584,921

UNITED STATES PATENT OFFICE 2,584,921

MEANS FOR COUNTERBALANCING A PIVOTED ARM OR MEMBER

David W. Rawnsley, South Kensington, London, Edward Ramsay Green, Guildford, and John George Gill, Rotherham, England Application February 10, 1949, Serial No. 75,686
In Great Britain February 13, 1948

5 Claims. (Cl. 74—592)

This invention relates to means for compensating a variable torque arising in a pivoted arm or member, due for example, to the displacement of its centre of gravity in relation to the axis about which it turns. The provision of this improved torque compensating means is intended to assist in balancing such an arm or member thereby enabling it to be driven and controlled by a transmitting mechanism of lesser size and power than would otherwise be necessary.

An example of pivoted arm or member to which this invention is applicable with advantage is to be found in the jib of a luffing crane, and especially so in cases where the provision of a counterweight is found to be impracticable owing say to limitations of size or maybe a desire to restrict the overall weight of the structure. In such a structure the torque required to restrain and control luffing movements of the jib will increase progressively as the centre of gravity of the moving mass assumes a greater overhang in relation to the axis about which the jib luffs and vice versa. However, it is conceivable that the mechanism here described may have useful applications in connection with pivoted members of other types which are subject to a variable torque resembling that arising in a luffing jib or pivoted arm.

According to the present invention the torque arising from an unbalanced pivoted arm or member is compensated by a loaded spring system imparting a restraining torque to the arm or member in approximate proportion to the degree to which the centre of gravity of the mass overhangs the axis about which the arm or member moves. For this purpose therefore the loaded spring system operates on the one hand upon the pivoted arm or member and on the other hand against a movable reaction point arranged to accentuate and relax the counterbalancing moment automatically as the degree of overhang in the arm or member increases and decreases.

The invention will be more fully described with reference to the accompanying drawings in which:

Figures 1 to 5 are perspective views showing the essential elements of the device, in various operative positions.

Figure 6 is a side elevation of a carriage for cinematograph screens, embodying the invention.

Referring to Figures 1 to 5 the device shown is suitable for use with a luffing crane and an arm 1 may be regarded as the luffing jib of said crane. The arm 1 is fixed to a shaft 2 which is suitably journalled so that the arm may pivot on the shaft axis and it is this pivoted arm or member to which the torque compensating means is to be applied. The jib is capable of luffing below as well as above the horizontal position. The jib is thus sustained at or near one end on the horizontal pivotal axis provided by the shaft 2 and is adapted to bear at its further or free end a weight or pay-load, not shown. For the purposes of controlling such a luffing jib and for imparting luffing movements thereto it is proposed that a motor or other source of power shall be operatively connected thereto by appropriate drive mechanism which may include toothed gearing and/or wire ropes and drums. It is not necessary at present to refer more particularly to these devices as a suitable arrangement is shown on Figure 6 and described later.

In addition to the driving mechanism just mentioned, there is also associated with the luffing jib a torque compensating means adapted to neutralise or at least to minimise the variable torque arising from changes in overhang of the centre of gravity as the jib is luffed. This compensating mechanism comprises a spring loaded system, shown here as a single tension spring 3, acting on the one hand against the jib or arm and on the other hand against a movable reaction or anchorage element 4 interconnected with the jib or arm in a manner described below, which causes the spring system to react on the jib or arm more or less in proportion to the overhang of the latter. The movable reaction or anchorage element 4 is mechanically interconnected to the luffing jib or arm in such a way that the effort applied thereto by the spring system operates sometimes in opposition to and at other times in sympathy with the out of balance moment of the jib or arm.

As shown the reaction or anchorage element 4 is a pin at the end of a crank 5 which is fixed to a shaft 6 so as to rotate about an axis parallel with that on which the jib 1 luffs. Fixed to the shaft 6 is a chain sprocket 7 connected by an endless chain 8 to a similar sprocket 9 attached to the shaft 2 on which the jib is mounted. When the jib 1 is vertically up or down Figures 1 and 5 the radial axis of the crank 5 is approximately at right angles to a line intersecting the pivoted axis of the jib and the crank. When the jib is horizontal (Figure 3) the crank is approximately in line with the pivotal axis of the jib and the crank and directed away from the axis of the jib.

The spring arrangement is connected on the one hand by a chain or wire rope 10 to a drum or sector 11 secured to the jib and on the other hand to the reaction or anchorage point 4. When the jib is vertically up there need be no appreciable tension in the spring system, but as the jib moves outwards and downwards towards the horizontal, the crank 5 will move towards its lowermost position (compare Figures 1 and 2), while the spring system will be extended in both directions, namely, at one end by the chain or wire rope 10 attached to the drum 11 on the jib and at the other end by the downward movement of the crank which is brought about by the endless chain 8 engaged with the two sprockets. During this quadrant of action the tension set up in the spring system rises and the latter operates not only through the drum or sector attached to the jib but also to some extent through the crank and endless chain (see the arrows on Figure 2) in countering the torque effects arising from the overhang in the jib. When the jib reaches the horizontal position, the crank comes to its lower dead centre (Figure 3) when no turning moment will be thrown back by way of the endless chain to the jib. In this position the pull of the spring system acting by way of the drum on the jib is wholly responsible for the balancing of the jib. As the jib moves from the horizontal towards its lower vertical position (see Figure 4) the spring becomes still further extended but as the crank forming the reaction or anchorage element now moves upwardly from its lower dead centre the tension of the spring system acts through the crank and the endless chain upon the jib in the same sense as does the pay-load. When the jib is vertically down (Figure 5) and the crank at approximately 90° to the line of action, the spring is fully extended and the tension in the drum chain (or rope) 10 and in the endless chain are approximately equal, but act on the jib in opposite directions thereby establishing a balance of approximately 0 torque.

The application of the device above described to a practical machine may be easily understood from Figure 6 where the arm 1 operates in just the same manner as the jib of a luffing crane. The arm supports a platform or gallery 12 and pivoted at 16 to said gallery is a screen frame 13 carrying a screen for cinematograph projection. The lower end of the screen is connected by a telescopic link 14 to one of the upright columns 15 of the carriage. By suitable adjustment of the length of this link 14 it may be caused to hold the screen either vertically or at an angle and at the same time steady it against swinging movements. The arm 1 has a toothed sector 17 fixed to its shaft 2 which sector meshes with a pinion 18 on a shaft 19 parallel to the axis of the arm 1. Affixed to the pinion 18 is a worm wheel 20 with which engages a worm 21 carried on the upper end of a shaft 22.

The shaft 22 at its lower end has a bevel gear wheel 23 which engages with another bevel gear wheel 24, this latter being capable of being driven by a motor through suitable control gear (not shown).

To the shaft 2 is fixed the sprocket wheel 9 as before and the chain 8 around the sprocket wheel also passes around the sprocket wheel 7 to the shaft 6 of which is fixed the crank 5 at the end of which is the spring anchorage 4. The spring 3 is connected by the cable 10 to a sector whose shape and size is substantially that of the half-rack wheel 17 and is therefore omitted from the figure.

By varying the size and contour of the drum 11 (which need not be circular) in relation to the crank radius, and by varying the relative size and shape of sprockets on the endless chain, and by variations in the initial setting of the crank angle, it is possible by means of this system of counterbalancing to obtain a wide variety of torque displacement characteristics.

It is moreover possible to use compounded springs which come into action at various points on a displacement, thereby providing additional means for matching the torque characteristics of the counterbalance system to that obtaining in the mechanism which it is required to balance.

We claim:

1. A device of the character stated for compensating for variations in torque comprising an arm pivotally supported at one end to swing about an axis, a sector coupled with the arm to extend oppositely to the arm and having a periphery turning concentric with said axis, means for swinging the arm from an upright to a depending position, a loading spring anchored at one end at a point remote from the sector, and a cable attached at one end to the other end of the spring, said cable having its other end attached to the periphery of the sector to be wound thereon against the resistance of the spring when the arm is swung from said upright to said depending position.

2. A device as set forth in claim 1, with means for moving the anchored end of the spring relative to the said other end of the cable.

3. A device as set forth in claim 1, with means mechanically coupling the arm and the anchored end of the spring for moving said anchored end relative to the said other end of the cable simultaneously with and in proportion to the swinging of the arm about said axis.

4. A device as set forth in claim 1, wherein the anchor for the said one end of the spring comprises a crank arm to one end of which the said one end of the spring is attached, a shaft having said crank arm thereon, and means for turning such shaft simultaneously with the swinging of the first arm about said axis.

5. A device as set forth in claim 1, wherein the support for said arm comprises a rotatable shaft, a second shaft, a direct driving coupling between said shafts, and the said anchor for the said one end of the spring comprising a crank arm secured to the second shaft and to which the spring is connected.

DAVID W. RAWNSLEY.
EDWARD RAMSAY GREEN.
JOHN GEORGE GILL.

REFERENCES CITED

The following references are of record in the file of this patent:

UNITED STATES PATENTS

| Number    | Name   | Date          |
|-----------|--------|---------------|
| 1,088,669 | Allen  | Feb. 24, 1914 |
| 2,178,122 | Ostler | Oct. 31, 1939 |
| 2,200,518 | Perbal | May 14, 1940  |
| 2,287,577 | Stava  | June 23, 1942 |

FOREIGN PATENTS

| Number  | Country       | Date         |
|---------|---------------|--------------|
| 539,084 | Great Britain | Dec. 9, 1940 |